(12) United States Patent
Ma et al.

(10) Patent No.: US 11,224,102 B2
(45) Date of Patent: Jan. 11, 2022

(54) ESTABLISHING RF EXCITATION SIGNAL PARAMETERS IN A SOLID-STATE HEATING APPARATUS

(71) Applicant: NXP USA, Inc., Austin, TX (US)

(72) Inventors: Minyang Ma, Tempe, AZ (US); Gregory J. Durnan, Tempe, AZ (US); Steven Y. Do, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 406 days.

(21) Appl. No.: 16/394,080

(22) Filed: Apr. 25, 2019

(65) Prior Publication Data

US 2019/0254127 A1      Aug. 15, 2019

Related U.S. Application Data

(62) Division of application No. 15/356,211, filed on Nov. 18, 2016, now Pat. No. 10,602,573.

(51) Int. Cl.
*H05B 6/00* (2006.01)
*H05B 6/68* (2006.01)
(Continued)

(52) U.S. Cl.
CPC ........... *H05B 6/686* (2013.01); *H05B 6/664* (2013.01); *H05B 6/705* (2013.01); *H05B 6/72* (2013.01);
(Continued)

(58) Field of Classification Search
CPC ... H05B 6/00; H05B 6/64; H05B 6/66; H05B 6/68; H05B 6/686; H05B 6/664; H05B 6/72; H05B 2206/044; Y02B 40/00
See application file for complete search history.

(56) References Cited

U.S. PATENT DOCUMENTS 6,784,405 B2   8/2004  Flugstad et al.
8,207,479 B2   6/2012  Ben-Shmuel et al.
(Continued)

FOREIGN PATENT DOCUMENTS

EP      2326141 A1     5/2011
WO    WO-2014/188422 A2   11/2014
(Continued)

OTHER PUBLICATIONS

Yang et al; "Design of 600 GHz 3-bit Delay-Line Phase Shifter Using RF NEMS Series Switches"; (Jun. 2011).

*Primary Examiner* — Robert J Utama
*Assistant Examiner* — Ayub A Maye
(74) *Attorney, Agent, or Firm* — Sherry W. Gourlay

(57) ABSTRACT

In a solid-state heating system, once a load with specific load characteristics has been placed in a heating cavity, a processing unit produces control signals that indicate an excitation signal frequency and one or more phase shifts, which constitute a combination of parameter values. Multiple microwave generation modules produce RF excitation signals characterized by the frequency and the phase shift(s). Multiple microwave energy radiators radiate, into the heating cavity, electromagnetic energy corresponding to RF excitation signals received from the microwave generation modules. Power detection circuitry takes reflected RF power measurements, and the processing unit determines a reflected power indication based on the measurements. The process is repeated for different combinations of the parameter values, and an acceptable combination of parameter values is determined and stored in a memory of the heating system. Acceptable combinations of parameter values similarly may be determined and stored for other loads with different load characteristics.

7 Claims, 6 Drawing Sheets

(51) Int. Cl.
*H05B 6/70* (2006.01)
*H05B 6/72* (2006.01)
*H05B 6/66* (2006.01)

(52) U.S. Cl.
CPC ......... *H05B 2206/044* (2013.01); *Y02B 40/00* (2013.01)

(56) References Cited

U.S. PATENT DOCUMENTS

| | | |
|---|---|---|
| 9,040,879 B2 | 5/2015 | Libman et al. |
| 9,215,756 B2 | 12/2015 | Bilchinsky et al. |
| 9,265,097 B2 | 2/2016 | Torres et al. |
| 10,088,436 B2 | 10/2018 | Ben Haim et al. |
| 2006/0081624 A1 | 4/2006 | Takada et al. |
| 2008/0193614 A1* | 8/2008 | Greiner ............... F24C 7/08 426/231 |
| 2009/0061070 A1* | 3/2009 | Greiner ............... F24C 7/08 426/665 |
| 2012/0111856 A1* | 5/2012 | Nobue ............... H05B 6/70 219/704 |
| 2012/0122072 A1 | 5/2012 | Bilchinsky et al. |
| 2012/0152940 A1 | 6/2012 | Oomori et al. |
| 2013/0080098 A1 | 3/2013 | Hadad et al. |
| 2015/0351164 A1 | 12/2015 | Wesson et al. |

FOREIGN PATENT DOCUMENTS

| | | |
|---|---|---|
| WO | WO-2015/037004 A1 | 3/2015 |
| WO | WO-2016/144872 A1 | 9/2016 |

* cited by examiner

ESTABLISHING RF EXCITATION SIGNAL PARAMETERS IN A SOLID-STATE HEATING APPARATUS

RELATED APPLICATION

This application is a divisional of co-pending, U.S. patent application Ser. No. 15/356,211, filed on Nov. 18, 2016.

TECHNICAL FIELD

Embodiments of the subject matter described herein relate generally to apparatus and methods for heating a load using radio frequency (RF) energy.

BACKGROUND

For many years, magnetrons have been commonly used in microwave ovens to generate microwave energy for the purpose of heating food, beverages, or other items. A magnetron essentially consists of a circular chamber with multiple cylindrical cavities spaced around its rim, a cathode built into the center of the chamber, and a magnet configured to generate a magnetic field. When incorporated into a microwave system, the cathode is coupled to a direct current (DC) power supply that is configured to provide a high voltage potential to the cathode. The magnetic field and the cylindrical cavities cause electrons within the cavity to induce a resonant, high-frequency radio frequency (RF) field in the cavity, and a portion of the field may be extracted from the cavity via a probe. A waveguide coupled to the probe directs the RF energy to a load. For example, in a microwave oven, the load may be a heating cavity, and the impedance of the heating cavity may be affected by objects within it.

Although magnetrons have functioned well in microwave and other applications, they are not without their disadvantages. For example, magnetrons typically require very high voltages to operate. In addition, magnetrons may be susceptible to output power degradation over extended periods of operation. Thus, the performance of systems in which magnetrons are included may degrade over time. Further, magnetrons tend to be bulky, heavy components that are sensitive to vibration, thus making their use in portable applications undesirable.

In more recent times, microwave heating apparatus have been proposed that utilize solid-state hardware to produce RF signals that are radiated into a heating cavity. The power required by solid-state microwave heating apparatus may be significantly less than the power required by magnetron-based systems. In addition, the performance of solid-state microwave heating apparatus does not degrade over time. Further, implementation of solid-state hardware enables RF signal characteristics to be varied throughout a cooking operation. Accordingly, developers seek RF signal control methods and apparatus that may improve the quality of cooking operations.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the subject matter described herein relate to solid-state heating apparatus that may be incorporated into stand-alone appliances or into other systems, and also to methods of characterizing and operating such solid-state heating apparatus for loads with a variety of load characteristics. As described in greater detail below, embodiments include methods for determining parameters for radio frequency (RF) excitation signals (i.e., RF signals radiated into a heating cavity) that result in acceptable reflected power and/or return loss during heating operations performed on loads with various load characteristics. In addition, embodiments include solid-state heating apparatus that are configured to produce RF excitation signals in accordance with the determined RF excitation signal parameters.

Generally, the term "heating" means to elevate the temperature of a load (e.g., a food load or other type of load) to a higher temperature. As used herein, the term "heating" more broadly means a process by which the thermal energy or temperature of a load is increased through provision of RF power to the load. Accordingly, in various embodiments, a "heating operation" may be defined as the provision of RF energy to a load with any initial temperature in order to raise the temperature of the load to any final temperature that is higher than the initial temperature. That said, the "heating operations" and "solid-state heating systems or apparatus" described herein alternatively may be referred to as "thermal increase operations" and "thermal increase systems or apparatus."

Figure 1:
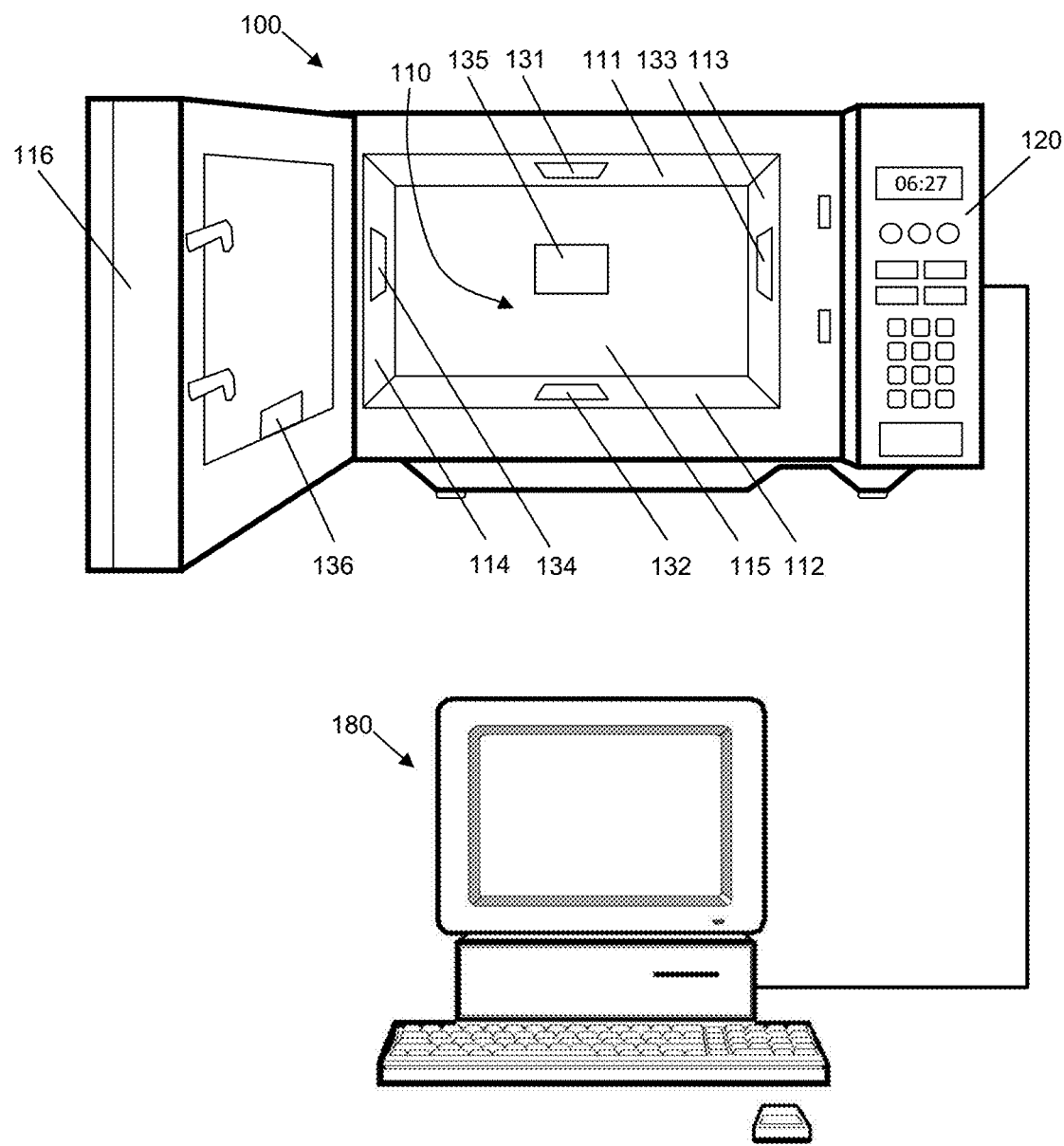
FIG. 1 is a perspective view of a solid-state heating system coupled to an external computer, in accordance with an example embodiment.

FIG. 1 is a perspective view of a solid-state heating system 100, in accordance with an example embodiment. Solid-state heating system 100 includes a heating cavity 110, a control panel 120, one or more microwave energy radiators 131, 132, 133, 134, 135, 136, one or more RF signal sources (e.g., RF signal generator 240, FIG. 2), one or more power detection circuits (e.g., power detection circuits 260-262, FIG. 2), and a processing unit (e.g., processing unit 280, FIG. 2). The heating cavity 110 is defined by interior surfaces of top, bottom, side, and back cavity walls 111, 112, 113, 114, 115 and an interior surface of door 116. With door 116 closed, the heating cavity 110 defines an enclosed air cavity. As used herein, the term "air cavity" may mean an enclosed area that contains air or other gasses (e.g., heating cavity 110).

According to an embodiment, each of the microwave energy radiators 131-136 is arranged proximate to a chamber wall 111-115 or to door 116. Further, each of the microwave energy radiators 131-136 receives a microwave signal from a microwave power generation module (e.g., modules 250-252, FIG. 2). As will be discussed in more detail later, each microwave signal is characterized by an excitation signal frequency and a phase shift, and the microwave energy radiators 131-136 radiate the received microwave signals into the heating cavity 110.

In one embodiment, an external computer 180 may be communicatively coupled to the solid-state heating system 100 in order to control various aspects of the operation of system 100, as well as to receive information from the system 100 indicating sensed or measured variables and/or other information. For example, such a setup may be implemented in a laboratory or factory setting to configure the system 100 prior to making the system 100 available to a consumer. In such an embodiment, the processing unit (not illustrated) of the external computer 180 conceptually may be considered to be a portion of the processing unit (e.g., processing unit 280, FIG. 2) of the solid-state heating system 100.

As will be described in more detail later, system configuration processes may include determining desirable phase, frequency, and/or other characteristics of RF signals that the microwave power generation modules of the system 100 will provide to the microwave energy radiators 131-136, given a plurality of different load conditions (i.e., characteristics of loads placed within the heating cavity 110). More specifically, for each of a variety of load types, states, and weights, the external computer 180 may control the system 100 to produce RF signals with multiple different phase and/or frequency characteristics, may receive signals from the system 100 indicating reflected power and/or return loss, and may determine excitation signal parameters (e.g., phase and/or frequency combinations) that result in an acceptable or best reflected power or return loss, given the characteristics of a particular load. For example, such determinations may be made by a processing unit (not illustrated) within the external computer 180. Once determined, the external computer 180 may cause the system 100 to store excitation signal parameter information (e.g., in memory 288, FIG. 2), which is correlated with the load type, state, and weight, and which may be accessed by the system 100 during subsequent heating operations. Given information about the load characteristics during such subsequent heating operations, this enables the system 100 later to generate RF signals that again should result in the acceptable reflected power and/or return loss. In other embodiments, the functionality of the external computer 180 may be entirely self-contained within the system 100. In addition, in some embodiments, the system 100 may perform the above-described control, monitoring, and evaluation processes to determine acceptable reflected power and/or return loss during each heating operation (e.g., including after a system 100 has been provided to an end consumer), rather than or in addition to performing these processes as a system configuration activity.

During operation of the solid-state heating system 100, a user (not illustrated) may place a load (e.g., food, liquids, and/or other types of loads) into the heating cavity 110, and optionally may provide inputs via the control panel 120 or via the external computer 180 that specify characteristics of the load. For example, the specified characteristics may include an approximate weight of the load. In addition, the specified load characteristics may indicate the material(s) from which the load is formed (e.g., bone-in or boneless meat, bread, liquid, and so on). Further still, the specified characteristics may indicate a state of the load (e.g., frozen or thawed, an approximate temperature, liquid or solid, and so on). In alternate embodiments, the load characteristics may be obtained in some other way, such as by scanning a barcode on the load packaging and retrieving load information corresponding to the barcode, receiving a radio frequency identification (RFID) signal from an RFID tag on or embedded within the load and retrieving load information corresponding to the RFID, receiving an indication of load weight (e.g., from a weight sensor 290, FIG. 2), and/or measuring an approximate temperature of the load (e.g., using temperature and/or infrared (IR) sensors 290, FIG. 2). Either way, as will be described in more detail later, information regarding such load characteristics enables the processing unit (e.g., processing unit 280, FIG. 2) or the external computer 180 to access or readily determine frequency and/or phase settings for RF excitation signals provided to the microwave energy radiators 131-136 in order to achieve acceptable reflected power and/or return loss during the heating operation. Alternatively, load characteristics may not be entered or received prior to commencement of a heating operation.

After placing the load into the heating cavity 110, and to begin a characterization and/or heating operation, the user may provide a "start" input via the control panel 120 or the external computer 180. In response, the controller within the system 100 (e.g., processing unit 280, FIG. 2) or the processing unit within the external computer 180 causes each of the microwave power generation modules (e.g., modules 250-252, FIG. 2) to provide RF signals with given frequencies and phases to each of the multiple microwave energy radiators 131-136. The microwave energy radiators 131-136 responsively radiate electromagnetic energy into the heating cavity 110.

As the RF energy is being supplied to the load, the system 100 measures the reflected power and/or return loss, and provides that information to the processing unit within the system 100 and/or to the external computer 180. More specifically, one or more power detection circuits (e.g., power detection circuits 260-262, FIG. 2) continuously or periodically measures the reflected power (and also possibly the forward power) along some or all of the transmission paths between the microwave power generation modules and each microwave energy radiator 131-136. The system 100 may then repeatedly alter the excitation signal parameters (e.g., frequency and/or phase shift) of some or all of the RF signals provided to the microwave energy radiators, and may determine and store a plurality of reflected power and/or return loss measurements. These reflected power and/or return loss measurements may be stored within the system 100 and/or the external computer 180. The system 100 or external computer 180 may then determine an excitation signal parameter combination (e.g., a frequency and/or phase shift combination) that results in optimal (e.g., best) and/or acceptable (e.g., below a threshold) reflected power and/or return loss. Information indicating the optimal and/or acceptable excitation signal parameter combination may then be stored within the system 100 for use during a subsequent heating operation under the same or similar load conditions.

During a heating operation, the electromagnetic energy supplied to a load increases the thermal energy of the load (i.e., the electromagnetic energy causes the load to warm up). Accordingly, the condition of the load (e.g., the impedance of the load) changes as the thermal energy of the load increases. The impedance changes alter the absorption of RF energy into the load, and thus alter the magnitude of reflected power. According to an embodiment, the above-described, iterative process may be repeated at various intervals in a heating process or for similar loads at different temperatures. For example, for a given load type and weight, a plurality of acceptable excitation parameter combinations for each of a variety of load states may be determined and stored within the system 100. As used herein, a "load type" may include one or more material and/or physical characteristics of a load, such as the material(s) from which the load is formed (e.g., bone-in beef, boneless chicken, bread, broth, pizza, butter, pre-packaged meal, and so on), the load shape or processing state (e.g., unprocessed, cubed, shredded, and so on), and a quantity of units in the load (e.g., 3 rolls, 4 chicken thighs, 2 pre-packaged frozen meals, and so on), along with other material and/or physical characteristics. A load weight may be defined in terms of known solid and liquid measurements (e.g., ounces, pounds, liquid ounces, and so on). A "load state" may indicate a variable characteristic of the load, such as load temperature, state of matter, and so on.

As illustrated, the solid-state heating system 100 of FIG. 1 is embodied as a stand-alone, counter-top type of appliance. Alternatively, components of a solid-state heating system may be incorporated into other types of systems or appliances. For example, the components and functionality of the solid-state heating system 100 may be incorporated into another type of appliance, such as a refrigerator/freezer appliance, an oven, a portable apparatus, and so on. Those of skill in the art would understand, based on the description herein, that embodiments of solid-state heating systems may be incorporated into systems or appliances having configurations other than that illustrated in FIG. 1. Accordingly, the above-described implementation of a solid-state heating system in a particular type of appliance is not meant to limit use of the inventive subject matter only to the illustrated and described type of system.

Further, although solid-state heating system 100 is shown with its components in particular relative orientations with respect to one another, it should be understood that the various components may be oriented differently, as well. In addition, the physical configurations of the various components may be different. For example, control panel 120 may have more, fewer, or different user interface elements, and/or the user interface elements may be differently arranged. In addition, although a substantially cubic heating cavity 110 is illustrated in FIG. 1, it should be understood that a heating cavity may have a different shape in other embodiments (e.g., cylindrical, and so on). Further, solid-state heating system 100 may include additional components (e.g., a fan, a stationary or rotating plate, a tray, an electrical cord, and so on) that are not specifically depicted in FIG. 1.

Figure 2:
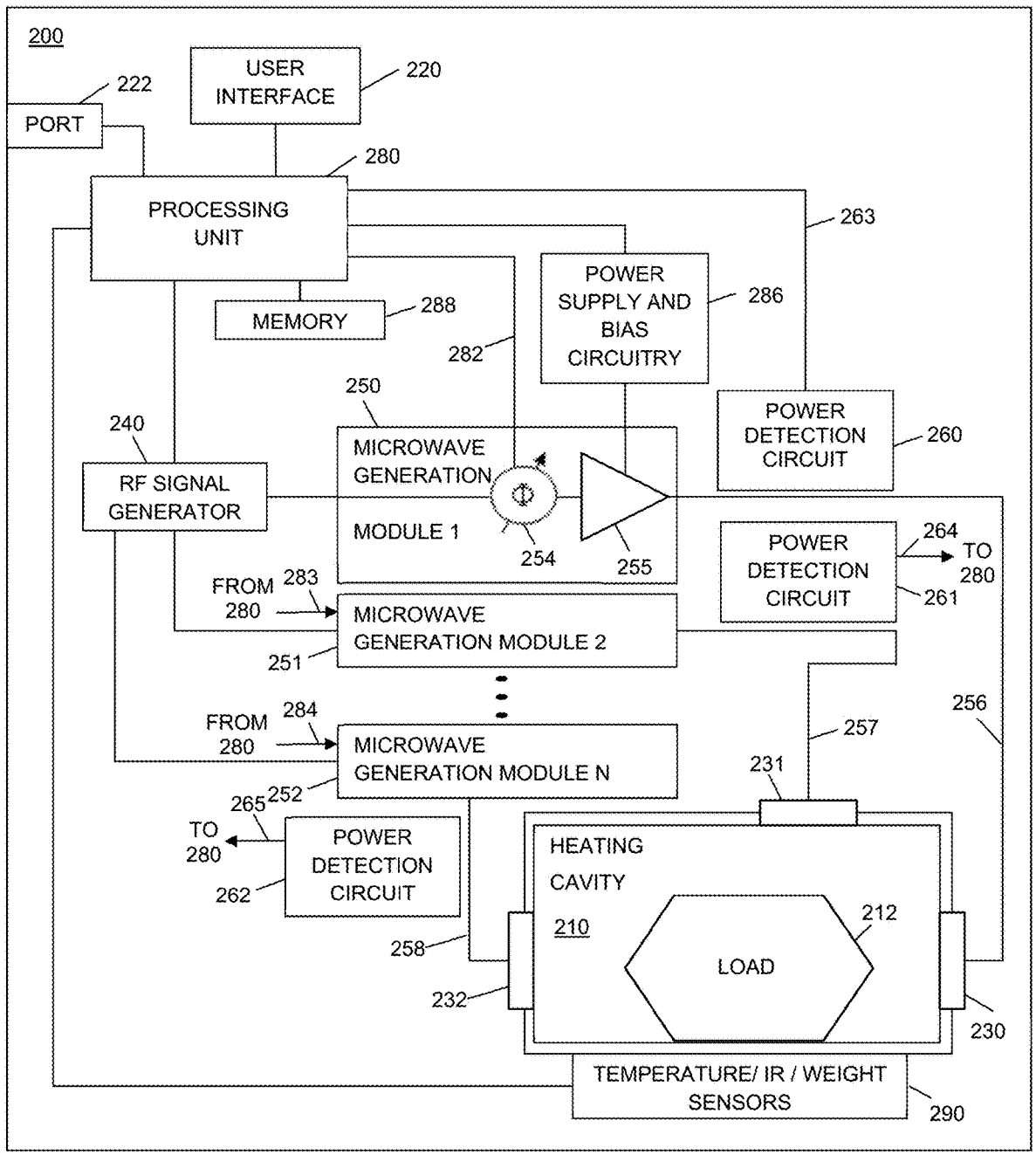
FIG. 2 is a simplified block diagram of a solid-state heating apparatus, in accordance with an example embodiment.

FIG. 2 is a simplified block diagram of a solid-state heating system 200 (e.g., solid-state heating system 100, FIG. 1), in accordance with an example embodiment. Solid-state heating system 200 includes heating cavity 210, user interface 220, N microwave energy radiators 230-232 (e.g., N may be any integer from 2 to 10 or more), RF signal generator 240, N microwave generation modules 250-252, N power detection circuits 260-262, a processing unit 280, power supply and bias circuitry 286, and memory 288, in an embodiment. In addition, in some embodiments, solid-state heating system 200 may include temperature sensor(s), infrared (IR) sensor(s), and/or weight sensor(s) 290, although some or all of these sensor components may be excluded. It should be understood that FIG. 2 is a simplified representation of a solid-state heating system 200 for purposes of explanation and ease of description, and that practical embodiments may include other devices and components to provide additional functions and features, and/or the solid-state heating system 200 may be part of a larger electrical system.

Heating cavity 210 (e.g., cavity 110, FIG. 1), which is configured to contain a load 212 to be heated, is defined by the interior surfaces of bottom, top, and side walls. According to an embodiment, the cavity 210 may be sealed (e.g., with a door 116, FIG. 1) to contain the electromagnetic energy that is introduced into the cavity 210 during a heating operation. The system 200 may include one or more interlock mechanisms that ensure that the seal is intact during a heating operation. If one or more of the interlock mechanisms indicates that the seal is breached, the processing unit 280 may cease the heating operation.

Heating cavity 210 and any load 212 (e.g., food, liquids, and so on) positioned in the heating cavity 210 present a cumulative load for the electromagnetic energy (or RF power) that is radiated into the cavity 210 by the N microwave energy radiators 230-232. More specifically, the cavity 210 and the load 212 present an impedance to the system, referred to herein as a "cavity input impedance." The cavity input impedance changes during a heating operation as the temperature of the load 212 increases.

User interface 220 may include a control panel (e.g., control panel 120, FIG. 1), for example, which enables a user to provide inputs to the system regarding parameters for a heating operation (e.g., characteristics of the load to be heated, duration of heating operation, and so on), start and cancel buttons, mechanical controls (e.g., a door/drawer open latch), and so on. In addition, the user interface 220 may be configured to provide user-perceptible outputs indicating the status of a heating operation (e.g., a countdown timer, visible indicia indicating progress or completion of the heating operation, and/or audible tones indicating completion of the heating operation) and other information. In some embodiments, communication with the system 200 also may be implemented using a data port 222, which may be configured to convey commands and other information between an external system (e.g., external computer 180, FIG. 1) and the system 200 (e.g., the processing unit 280).

Processing unit 280 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, processing unit 280 is coupled to user interface 220, data port 222 (if included), RF signal generator 240, microwave power generation modules 250-252, power detection circuits 260-262, power supply and bias circuitry 286, and sensors 290 (if included). Processing unit 280 is configured to receive signals indicating inputs received via user interface 220 and/or port 222, to receive signals indicating temperature and/or weight via sensors 290 (when included), and to receive reflected power measurements from power detection circuit 260-262 over connections 263-265. In addition, processing unit 280 may receive forward power measurements from power detection circuits 260-262, in some embodiments. Based on the input signals received from user interface 220, port 222, and sensors 290, processing unit 280 determines a combination of excitation signal parameters, and provides control signals to the RF signal generator 240 and microwave generation modules 250-252, which indicate the one or more determined excitation signal parameters. As used herein, an "excitation signal" is an RF signal provided by any microwave power generation module 250-252 over a connection 256-258 to a microwave energy radiator 230-232. An "excitation signal parameter" is an electrical characteristic of an excitation signal, including but not by way of limitation, a frequency of an excitation signal, a phase shift of an excitation signal with respect to another instance of the excitation signal, a power level of an excitation signal, or another electrical characteristic of an excitation signal.

For example, an excitation signal parameter may be a frequency or a range of frequencies at which the RF signal generator 240 should provide RF signals to the microwave power generation modules 250-252. Upon determining a frequency or range of frequencies based on the input signals received from user interface 220, port 222, and/or sensors 290, processing unit 280 may provide a control signal to RF signal generator 240 indicating the determined frequency or range of frequencies. In response to the received control signal(s), the RF signal generator 240 produces an excitation signal at the indicated frequency or within the indicated range of frequencies. According to an embodiment, the RF signal generator 240 may be configured to produce an oscillating electrical signal having a frequency in the ISM (industrial, scientific, and medical) band, although the system could be modified to support operations in other frequency bands, as well. In the illustrated embodiment, only a single RF signal generator 240 is shown. In alternate embodiments, system 200 may include multiple RF signal generators (e.g., NRF signal generators), each of which receive control signals from the processing unit 280. Either way, each RF signal generator 240 may be controlled to produce oscillating signals of different power levels and/or different frequencies, in various embodiments. For example, the RF signal generator 240 may produce a signal that oscillates in a range of about 2.0 megahertz (MHz) to about 200 MHz. Some desirable frequency ranges may include, for example, 13.56 MHz (+/−5 percent), 27.125 MHz (+/−5 percent), 40.68 MHz (+/−5 percent), and 2.45 gigahertz (GHz) (+/−5 percent). In one particular embodiment, for example, the RF signal generator 240 may produce a signal that oscillates in a range of about 2.40 GHz to about 2.50 GHz and at a power level in a range of about 10 decibels (dB) to about 15 dB. Alternatively, the frequency of oscillation and/or the power level may be lower or higher than the above-given ranges or values.

In addition to excitation signal frequency, an excitation signal parameter may be a phase shift to be applied by a microwave power generation module 250-252 to an excitation signal received from the RF signal generator 240. In an embodiment, each microwave power generation module 250-252 includes a variable phase shifter 254 (only one shown) coupled in series with an amplifier 255 (only one shown). Upon determining phase shifts for each of the microwave generation modules 250-252 based on the input signals received from user interface 220, port 222, and/or sensors 290, processing unit 280 may provide control signals to the phase shifter 254 within each of the microwave power generation modules 250-252 over connections 282-284, which indicate phase shifts to be applied by the phase shifters 254 to the RF signals received from the RF signal generator 240. In response to the received control signal(s), the phase shifters 254 apply corresponding phase shifts to the excitation signals received from the RF signal generator 240.

FIG. 2 shows the variable phase shifter 254 having an input coupled to the RF signal generator 240, and an output coupled to the amplifier 255 (i.e., the phase shifter 254 is coupled between the generator 240 and the amplifier 255). In an alternate embodiment, the amplifier 255 may be coupled between the RF signal generator 240 and the variable phase shifter 254 (i.e., an input to the amplifier 255 may be coupled to the signal generator 240, and an output of the amplifier 255 may be coupled to the input to the phase shifter 254). Either way, the input of each microwave power generation module 250-252 is coupled to the RF signal generator 240, and the output each microwave power generation module 250-252 is coupled to a microwave energy radiator 230-232 through a transmission line 256-258.

In the illustrated series configuration, the variable phase shifter 254 is configured to receive an RF signal from the RF signal generator 240, and to apply a phase shift to the signal that corresponds to a phase shift indicated in a control signal received over one of connections 282-284 from the processing unit 280. The amplifier 255 receives the phase shifted RF signal from the variable phase shifter 254 (or an unshifted signal if a phase shift of 0 degrees was imparted), and amplifies the RF signal to produce an amplified and potentially phase shifted output RF signal. Each amplifier 255 may be implemented using any of a variety of amplifier topologies. For example, each amplifier 255 may include various embodiments of a single ended amplifier, a double ended amplifier, a push-pull amplifier, a Doherty amplifier, a Switch Mode Power Amplifier (SMPA), or another type of amplifier.

Each power amplifier 255 may be implemented as a single-stage or a multi-stage power amplifier (e.g., including a driver amplifier stage and a final amplifier stage). The power amplifier 255 is configured to receive the oscillating signal from the variable phase shifter 254 (or from the RF signal generator 240 if the series configuration is reversed), and to amplify the signal to produce a significantly higher-power signal at an output of the power amplifier 255. For example, the output signal may have a power level in a range of about 100 watts to about 400 watts or more.

The gain applied by the power amplifier 255 may be controlled using gate bias voltages and/or drain supply voltages provided by the power supply and bias circuitry 286 to each stage of the amplifier 255. More specifically, power supply and bias circuitry 286 may provide bias and supply voltages to each RF amplifier stage in accordance with control signals received from processing unit 280. Thus, according to a further embodiment, processing unit 280 may provide control signals to power supply and bias circuitry 286, which cause the circuitry 286 to adjust the gate and/or drain bias voltages provided to amplifiers 255 within the microwave power generation modules 250-252.

In an embodiment, each amplifier stage is implemented as a power transistor, such as a field effect transistor (FET), having an input terminal (e.g., a gate or control terminal) and two current carrying terminals (e.g., source and drain terminals). For a single stage amplifier, impedance matching circuits (not illustrated) may be coupled to the input (e.g., gate) of the single amplifier stage, and/or to the output (e.g., drain terminal) of the single amplifier stage. For a two-stage amplifier, impedance matching circuits (not illustrated) may be coupled to the input (e.g., gate) of the driver amplifier stage, between the driver and final amplifier stages, and/or to the output (e.g., drain terminal) of the final amplifier stage, in various embodiments. In an embodiment, the power transistor of each amplifier stage includes a laterally diffused metal oxide semiconductor FET (LDMOSFET) transistor. However, it should be noted that the transistors are not intended to be limited to any particular semiconductor technology, and in other embodiments, each transistor may be realized as a gallium nitride (GaN) transistor, another type of MOSFET transistor, a bipolar junction transistor (BJT), or a transistor utilizing another semiconductor technology.

Each amplified and potentially phase shifted RF signal produced by a microwave power generation module 250-252 is provided over a transmission path 256-258 to one of the N microwave energy radiators 230-232. For example, each of the transmission paths 256-258 may include an impedance matching network and a conductor (e.g., a coaxial cable or other type of conductor).

According to an embodiment, a power detection circuit 260-262 is coupled along each transmission path 256-258 between the output of each microwave power generation module 250-252 and the input to each microwave energy radiator 230-232. Each power detection circuit 260-262 is configured to monitor, measure, or otherwise detect the power of the reflected signals (i.e., from one of the N microwave energy radiators 230-232 toward one of the microwave generation modules 250-252) traveling along the transmission paths 256-258. According to a further embodiment, each power detection circuit 260-262 also may be configured monitor, measure, or otherwise detect the power of the forward signals (i.e., from one of the microwave generation modules 250-252 toward one of the N microwave energy radiators 230-232).

Power detection circuits 260-262 supply signals conveying the magnitudes of the reflected signal power (and possibly the forward signal power) to processing unit 280 over connections 263-265. Processing unit 280, in turn, may calculate a ratio of reflected signal power to forward signal power and/or return loss from the received measurements. As will be described in more detail below, the processing unit 280 may modify RF excitation signal parameters in order to find combinations of excitation signal parameters that result in acceptable or optimal reflected power and/or return loss given a load with particular load characteristics.

As mentioned above, some embodiments of solid-state heating system 200 may include temperature sensor(s), IR sensor(s), and/or weight sensor(s) 290 that may be useful in determining load characteristics. The temperature sensor(s) and/or IR sensor(s) may be positioned in locations that enable the temperature of the load 212 to be sensed during the heating operation. When provided to the processing unit 280, the temperature information enables the processing unit 280 to select a combination of excitation signal parameters, to alter the power of the RF signal supplied by the RF signal generator 240 (e.g., by controlling the bias and/or supply voltages provided by the power supply and bias circuitry 286), and/or to determine when a heating operation should be terminated. The weight sensor(s) are positioned under the load 212, and are configured to provide an estimate of the weight of the load 212 to the processing unit 280. The processing unit 280 may use this information, for example, to select a combination of excitation signal parameters, to determine a desired power level for the RF signal supplied by the RF signal generator 240, and/or to determine an approximate duration of a heating operation.

According to an embodiment, system 200 is configured to determine a combination of excitation signal parameters that results in acceptable reflected power and/or return loss for a load having known or determined load characteristics. Determination of the excitation signal parameters may be performed, for example, in the factory during a system calibration process. In addition or alternatively, determination of the excitation signal parameters may be performed "in the field" after a system has been sold to a consumer. According to several embodiments, such as those covered in the context of FIGS. 3-5, a load 212 having particular load characteristics is placed within the heating cavity 210, and an iterative process of irradiating the load 212 with microwave energy and measuring reflected power is performed, during which excitation signal parameters that result in acceptable return loss are determined.

The determined excitation signal parameters are stored (e.g., in memory 288) for use during subsequent heating operations. For example, during such a subsequent heating operation, known or determined load characteristics may be used as keys to access frequency and/or phase shift information stored within the system (e.g., within memory 288, FIG. 2). For example, a multi-dimensional table (referred to herein as an "excitation table") stored in system memory may indicate acceptable frequency and phase shift settings for a plurality of load types, weights, and states (e.g., load temperatures). An example of an unpopulated version of such an excitation table is shown below:

TABLE 1

| Load type + weight | Excitation Table (unpopulated) Temp (deg F.) | | | | | | |
|---|---|---|---|---|---|---|---|
| | 0 | 20 | 40 | 60 | 80 | ... | 200 |
| Chicken (4 oz) | | x | | | | | |
| Chicken (8 oz) | | | | | | | |
| Chicken (16 oz) | | | | | | | |
| ... | | | | | | | |
| Beef (4 oz) | | | | | | | |
| ... | | | | | | | |
| Broth (24 fl oz) | | | | y | | | |

Various embodiments of processes for determining acceptable excitation signal parameters are described in detail below in conjunction with FIGS. 3-5, and those processes are used to populate an excitation table such as the one shown above. Each excitation table, once populated, may uniquely correspond to a single system (e.g., to one microwave oven), or may correspond to a group of systems that have the same system configuration (e.g., to a group of identically-manufactured microwave ovens). Once a below-described method embodiment has been completed for a plurality of loads with various characteristics, and the excitation table has been fully populated, the excitation table may be stored within system memory (e.g., memory 288, FIG. 2) for use during subsequent heating operations.

Figure 3:
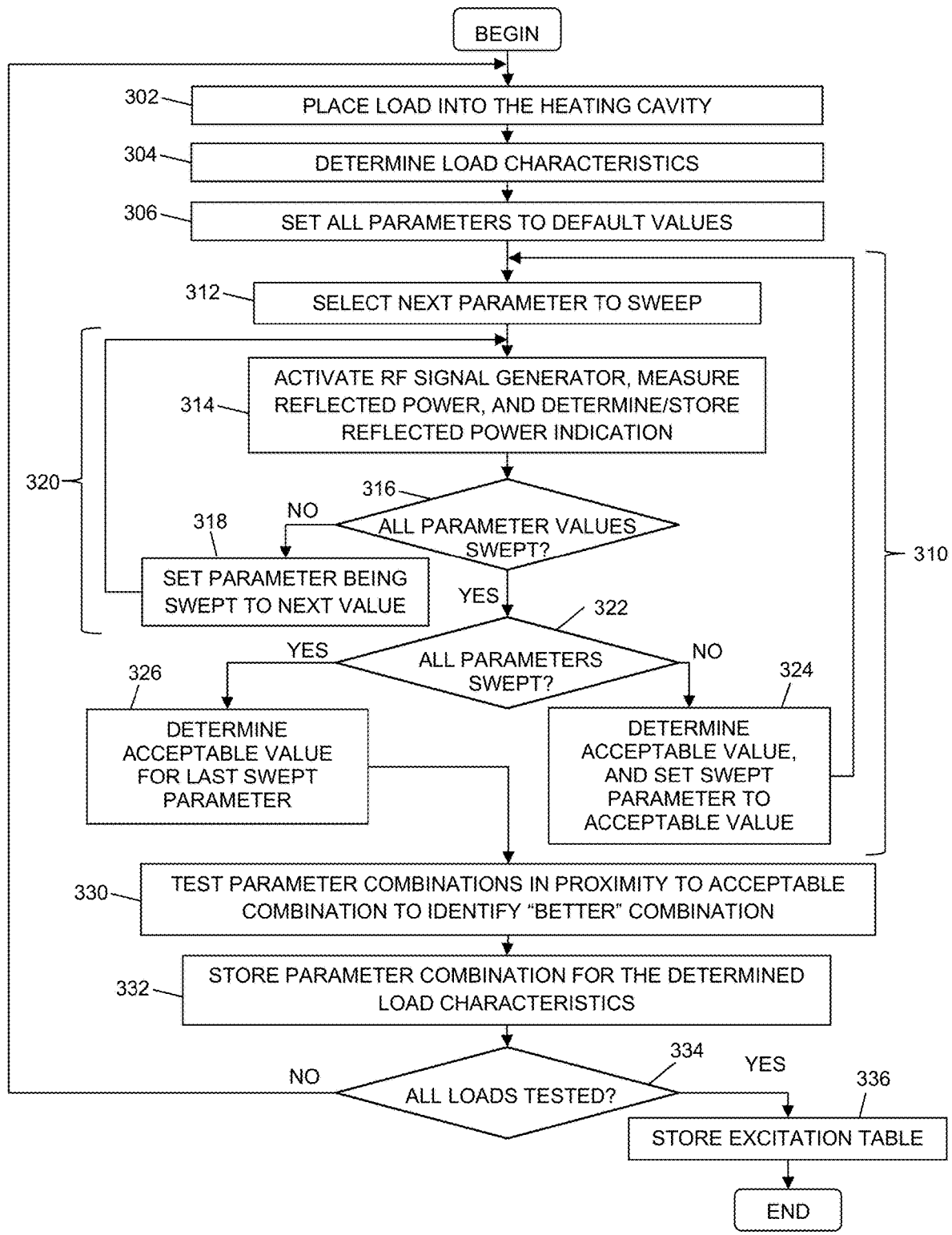
FIG. 3 is a flowchart of a method of operating a solid-state heating apparatus to determine acceptable excitation signal parameters, in accordance with an example embodiment.

FIG. 3 is a flowchart of a method of operating a solid-state heating system (e.g., system 100, 200, FIGS. 1, 2) to determine acceptable excitation signal parameters, in accordance with an example embodiment. In the description below, a number of references are made to processes performed by the processing unit (e.g., processing unit 280, FIG. 2). It should be understood that, in other embodiments, some or all of the processes indicated to be performed by the processing unit may be performed by a processing unit within an external computer (e.g., computer 180, FIG. 1). In addition, data generated during the below-described processes may be stored within the system (e.g., in system memory 288, FIG. 2) or within external memory (e.g., memory of external computer 180, FIG. 1).

The method of FIG. 3 may be performed multiple loads, each having specific initial load characteristics (e.g., one pound of chicken at 20 degrees Fahrenheit (F), 8 ounces of broth at 60 degrees F., and so on). For each different load, a combination of excitation signal parameters determined using the method may then be stored in a cell within an excitation table that corresponds to the initial load characteristics (e.g., the cell marked with an "x" in the excitation table, above, that corresponds to chicken at 20 degrees F., or the cell marked with a "y" that corresponds to broth at 60 degrees F.), and the method may be repeated for loads having other initial load characteristics.

In any event, the method may begin, in block 302, when the load (e.g., load 212, FIG. 2) is placed into the system's heating cavity (e.g., heating cavity 210, FIG. 2), and the heating cavity is sealed (e.g., by closing door 116, FIG. 1). In some embodiments, the cavity is considered to be sealed when one or more safety interlock mechanisms are engaged.

In block 304, one or more characteristics of the load may be determined. For example, as discussed previously, load characteristics may include the material(s) from which the load is formed (e.g., meat, bread, liquid), a state of the load (e.g., frozen or thawed, at a particular temperature, liquid or solid), a weight of the load, and so on. In some embodiments, information indicating the load characteristics may be input by a user via the system's user interface (e.g., user interface 120, 220, FIGS. 1, 2) or using an external computer (e.g., computer 180, FIG. 1), which communicates with the system through a data port (e.g., data port 222, FIG. 2). In alternate embodiments, the load characteristics may be obtained in some other way, such as by scanning a barcode on the load packaging and retrieving (e.g., from memory 288 or from a link to an external network) load information corresponding to the barcode, receiving an RFID signal from an RFID tag on or embedded within the load and retrieving (e.g., from memory 288 or from a link to an external network) load information corresponding to the RFID, receiving an indication of load weight from a sensor (e.g., weight sensor 290, FIG. 2), and/or measuring an approximate temperature of the load (e.g., using temperature and/or IR sensors 290, FIG. 2). The load characteristics indicate the cell (e.g., in an excitation signal table, such as Table 1, above) for which a combination of excitation signal parameters are being determined.

According to an embodiment, each combination of excitation signal parameters includes at least one excitation signal frequency and at least one phase shift. In a more specific embodiment, the excitation signal parameters include one excitation frequency, f, and N phase shift values, $p_1 \ldots p_N$. With one excitation frequency parameter and N phase shift parameters, the number of excitation signal parameters in each combination equals N+1. The excitation frequency, f, corresponds to the frequency of the excitation signal generated by the RF signal generator (e.g., RF signal generator 240, FIG. 2), and each phase shift value corresponds to a phase shift applied by one of the N variable phase shifters (e.g., phase shifters 254, FIG. 2) within a microwave power generation module (e.g., modules 250-252, FIG. 2). In some embodiments, the excitation signal parameters may include more than one excitation frequency (e.g., when a system includes more than one RF signal generator), and/or the excitation signal parameters may include fewer than N phase shift values. Further, the power of the excitation signal produced by the RF signal generator, and/or the gain applied by the amplifiers (e.g., amplifiers 255, FIG. 2) may be included in a combination of excitation signal parameters. In such embodiments, the number of excitation signal parameters may be less than or greater than N+1. The embodiments described herein use an example of a combination of excitation signal parameters that includes one excitation signal frequency parameter and N phase shift parameters. The embodiments of the inventive subject matter are intended to include combinations of excitation signal parameters (and methods of their determination) that include more, fewer, and different excitation signal parameters.

Each excitation signal parameter may be constrained to a range, in an embodiment, and may have any of a plurality of discrete values within the range. For example, the excitation signal frequency parameter, f, may be constrained to a range between about 2.40 GHz and 2.50 GHz, in an embodiment, and may have one of a plurality of discrete values that are 10 megahertz (MHz) apart. This would yield 11 possible RF signal source frequency settings. In such an example, the excitation signal frequency may have a value (in GHz) of 2.40, 2.41, 2.42, 2.43 . . . 2.48, 2.49, and 2.50. As a further example, each of the phase shift parameters may be constrained to a range between 0 degrees and 360 degrees, in an embodiment, and may have one of a plurality of discrete values that are 15 degrees apart. In such an example, any given phase shift may have a value (in degrees) of 0, 15, 30, 45 . . . , 330, 345, and 360. This would yield 25 possible phase settings for each of the N phase shifters. For purpose of explanation and not of limitation, the above-given ranges and step sizes (between values) will be used below in the further description of the process. Other ranges and/or step sizes could be used in other embodiments.

To begin the excitation signal parameter determination process, the user may provide a "start" input via the control panel (e.g., control panel 120, 220, FIGS. 1, 2) or via the external computer (e.g., computer 180, FIG. 1). In response, the processing unit (e.g., processing unit 280, FIG. 2) initializes the process by setting all excitation signal parameters to default values in block 306. For example, the default values may be values at the lowest end of each range of possible values, at the highest end of each range of possible values, or at some intermediate value within each range. For purpose of explanation, assume that the default values correspond to the values at the lowest end of each range. Using the above-given example frequency and phase shift ranges, the default excitation signal frequency parameter, f, may be 2.40 GHz, and the N phase shift parameters, $p_1 \ldots p_N$, each may be 0 degrees, for example.

An iterative process is then performed to determine a combination of acceptable excitation signal parameters (i.e., excitation signal parameters that result in acceptable (below a threshold) or optimal (lowest) reflected power and/or return loss). According to an embodiment, the iterative process includes an outer loop 310 that is performed once for each of the (e.g., N+1) parameters, and an inner loop 320 that "sweeps" through all potential parameter values for whichever parameter currently is being varied. To initiate the outer loop 310, a first parameter to be swept (for the first iteration of loop 310) or next parameter to be swept (for subsequent iterations of loop 310) is selected in block 312. For example, a first parameter to be swept may be the excitation signal frequency, although a first parameter to be swept alternatively may be one of the N phase shifts.

In block 314, and assuming that the first parameter to be swept is the excitation signal frequency, and for the first iteration of loop 320, the processing unit (e.g., processing unit 280, FIG. 2) activates the RF signal generator (e.g., RF signal generator 240, FIG. 2) by sending one or more control signals to the RF signal generator, which indicate that the RF signal generator should produce an excitation signal having a frequency equal to the default excitation signal frequency that was set in block 306. In addition, the processing unit sends control signals (e.g., over connections 282-284, FIG. 2) to the variable phase shifter (e.g., phase shifter 254, FIG. 2) of each of the microwave power generation modules, which indicate that each of the variable phase shifters should apply phase shifts to the excitation signals received from the RF signal generator that are equal to the default phase shifts that were set in block 306. In response to the control signals, the RF signal generator produces the excitation signal at the specified frequency, the phase shifters phase shift the excitation signal by the specified phase shifts (when the phase shifts are non-zero), and each of the amplifiers (e.g., amplifier 255, FIG. 2) amplifies a received excitation signal to provide a potentially phase shifted excitation signal to the microwave energy radiators (e.g., microwave energy radiators 230-232, FIG. 2). In other words, the processing unit causes each of the microwave power generation modules (e.g., modules 250-252, FIG. 2) to provide a plurality of RF excitation signals with given frequencies and phases to each of the plurality of microwave energy radiators, where the plurality of RF excitation signals have signal characteristics that are defined according to the selected combination of RF excitation signal parameter values. The microwave energy radiators responsively radiate electromagnetic energy into the heating cavity (e.g., cavity 110, 210, FIGS. 1, 2), thus supplying RF energy to the load.

While the multiple RF excitation signals are being provided to the microwave energy radiators and the RF energy is being supplied to the load (e.g., load 212, FIG. 2), the system measures at least the reflected RF power using power detection circuits (e.g., circuits 260-262, FIG. 2) disposed along the transmission paths (e.g., paths 256-258, FIG. 2) between the microwave power generation modules and the microwave energy radiators. According to an embodiment, the power detection circuits also may measure the forward power along the transmission paths. In any event, each power detection circuit sends, to the processing unit, one or more signals indicating the magnitude of the measured reflected power (and the magnitude of measured forward power, if determined).

The processing unit then determines and stores a "reflected power indication" in a volatile table, referred to herein as a "reflected power indication table." As used herein, a "reflected power indication" may include any data that represents a magnitude of reflected power, a magnitude of return loss, data used to calculate reflected power or return loss, or other similar data. A "reflected power indication table" is a table, stored electronically, into which reflected power indications are stored, where the stored reflected power indications may be indexed by excitation parameter values.

In some embodiments, the reflected power indication table may include all of the raw data collected in conjunction with generating each reflected power indication (i.e., the N measurements received from each of the N power detection circuits). For example, a reflected power indication table may be an N+1 dimensional table, where each dimension corresponds to one of the N+1 excitation signal parameters. A table row is associated with each excitation parameter, and a table column is associated with each possible parameter value for each parameter. Thus, according to the above-described example, in a system that implements one RF signal source and 4 phase shifters, where there are 11 possible RF signal source frequency settings and 25 possible phase settings for each of 4 phase shifters, the reflected power indication table may include $11 \times 25^4 = 4,296,875$ cells, with each cell being associated with a different combination of parameter values.

Testing each of the approximately 4.3 million parameter combinations for multiple loads with different characteristics may be impractical from a time perspective. Accordingly, as described herein, embodiments of methods for determining acceptable combinations of excitation signal parameters evaluate a subset of the possible combinations. That said, each cell within the reflected power indication table theoretically may be used to store one or more values that indicate the magnitude of reflected power or return loss for a given combination of parameter values. For example, for the first iteration of block 314, and assuming that N=4, a cell may be populated with a reflected power indication that reflects the magnitude of reflected power or return loss when the excitation signal is defined by a frequency f=2.40 GHz, and the phase shifters apply phase shifts of $p_1=0$ degrees, $p_2=0$ degrees, $p_3=0$ degrees, and $p_4=0$ degrees.

Because the processing unit receives at least one magnitude measurement from each of the N power detection circuits, the processing unit may be configured to store, in the reflected power indication table, the raw data associated with all of the magnitude measurements. Alternatively, the processing unit may apply a mathematical function to the measurements contemporaneously received from the N power detection circuits, and may store, in the reflected power indication table, a reflected power indication that is a value that is calculated using the mathematical function. For example, the processing unit may calculate and store the reflected power indication as an average of N reflected power measurements that are contemporaneously received. Alternatively, the processing unit may calculate and store the reflected power indication as an average of N return loss measurements based on reflected and forward power measurements that are contemporaneously received, in embodiments in which the forward power is measured. Other mathematical functions alternatively may be applied to determine a reflected power indication (e.g., including values derived from measurements taken within a sliding temporal window). The processing unit may store, as the reflected power indication, the raw or average reflected power measurements, the raw or average forward power measurements, and/or a return loss calculation that is derived from the reflected and forward power measurements. For example, the processing unit may calculate the return loss as the logarithm of the ratio of the reflected to forward power detected by each power detection circuit. Once again, the processing unit may store a return loss value for each of the N transmission lines, or may store a return loss value that represents a mathematical average (or some other function) of multiple return loss calculations that are based on multiple contemporaneously received reflected and forward power measurements. In another alternate embodiment, the system may include fewer than N power detection circuits (e.g., as few as one power detection circuit), and the system may determine the reflected power indication based on a number of measurements that is less than N.

According to an embodiment, after generating a reflected power indication for the current combination of excitation signal parameters, the processing unit then prepares to test a combination that includes a next value for the parameter whose values are being swept (e.g., the excitation signal frequency during the first iteration of loop 310). Prior to doing so, in block 316, a determination is made whether all parameter values for the last-selected parameter (i.e., the parameter last selected in block 312) have been tested (or "swept"). If not, then the processing unit sets the parameter to a next (untested) value in block 318. For example, the processing unit may increment or decrement the parameter value by a step size. For example, when the parameter being tested is the excitation signal frequency, and the step size is 10 MHz, the processing unit may change the excitation signal frequency from the just-tested value (e.g., 2.40 GHz) to a value that is incremented by the step size (e.g., 2.40 GHz+10 MHz=2.41 GHz). Blocks 314 and 316 are then repeated for a combination of excitation signal parameters that includes the new parameter value. Iterations of loop 320 continue to be performed until all parameter values for the parameter most recently selected in block 312 have been tested (e.g., all potential values for the last-selected parameter have been swept), and the resulting reflected power indications have been stored in the reflected power indication table.

Referring again to block 316, when all parameter values for the last-selected parameter have been tested (e.g., all frequencies have been tested and the reflected power indication table has been populated with reflected power indications), a further determination is made in block 322 whether or not all parameters have been swept. More specifically, for example, block 322 determines whether the excitation frequency, f, and all N phase shifts have been swept.

If not, then in block 324, an acceptable value for the last-selected (and just-swept) parameter is determined from the results stored in the volatile reflected power indication table. According to various embodiments, the "acceptable value" may be a parameter value, for the last-selected parameter, that resulted in the lowest return loss or reflected power, a parameter value that resulted in a return loss that is below a pre-determined threshold (e.g., −15 dB), or a parameter value that resulted in a reflected power that is below a pre-determined threshold (e.g., −15 dB). Once the acceptable value for the just-swept parameter has been determined, the processing unit re-sets the just-swept parameter to the acceptable value. For example, assuming that the just-swept parameter was excitation signal frequency, and the processing unit determined that an excitation frequency of 2.47 GHz resulted in the lowest return loss or lowest reflected power, the processing unit may set the excitation signal frequency parameter to 2.47 GHz for each upcoming iteration of the method. Alternatively, the processing unit may compare the return loss or reflected power measurements for all of the tested frequencies to the above-mentioned, pre-determined threshold, and may deem any frequencies that yielded results below the threshold to be "acceptable." The processing unit may then select any value that compares favorably to the pre-determined threshold (e.g., any value that is less than the pre-determined threshold) to be the "acceptable value" that the system will use during future iterations of loop 310. According to an embodiment, the excitation signal frequency will remain set to the acceptable value (e.g., 2.47 GHz in the above example) for the duration of the calibration process for this load (i.e., while all previously-unswept parameters are swept). The excitation frequency value associated with the selected acceptable reflected power indication is referred to as $f_{ACC}$, below.

Once the just-swept parameter has been set to an acceptable value for that parameter, a next iteration of the outer loop 310 is performed. More specifically, in block 312, a next parameter is selected for testing. For example, when the first parameter that was tested was the excitation frequency, f, the next parameter to be tested may be one of the N phase shift values, $p_1 \ldots p_N$. For the purpose of explanation, the description below assumes that the next parameter selected for testing is a phase shift, $p_1$, to be applied by a first phase shifter (e.g., phase shifter 254, FIG. 2) of the N phase shifters. At this point in the process, the excitation signal frequency is set to $f=f_{ACC}$, and the phase shift values are set to $p_1$=0 degrees (default value), $p_2$=0 degrees (default value), $p_3$=0 degrees (default value), and $p_4$=0 degrees (default value). Because a phase shift for $p_1$ of 0 degrees had already been tested at $f=f_{ACC}$ while sweeping the excitation signal frequencies, the processing unit may set $p_1$ to a next (untested) value prior to performing block 314. For example, the processing unit may increment $p_1$ by a step size. For example, when the step size for testing phase shifts is 15 degrees, the processing unit may change the value for $p_1$ from zero degrees to a value that is incremented by the step size (e.g., 15 degrees). At this point, the excitation signal frequency is set to $f=f_{ACC}$, and the phase shift values are set to $p_1$=15 degrees, $p_2$=0 degrees (default value), $p_3$=0 degrees (default value), and $p_4$=0 degrees (default value). As indicated previously, the default value for each of the phase shifts may be a value other than 0 degrees, as well. Blocks 314 and 316 are then performed as discussed above.

More specifically, in block 314, and assuming that the next parameter to be swept is $p_1$, the processing unit (e.g., processing unit 280, FIG. 2) activates the RF signal generator (e.g., RF signal generator 240, FIG. 2) by sending one or more control signals to the RF signal generator, which indicate that the RF signal generator should produce an excitation signal having a frequency equal to the selected "acceptable" frequency, $f_{ACC}$, that was set in block 324. In addition, the processing unit sends control signals (e.g., over connection 282, FIG. 2) to the variable phase shifter (e.g., phase shifter 254, FIG. 2) of the first microwave power generation module (e.g., module 250, FIG. 2), which indicate that the first variable phase shifter should apply a phase shift to the excitation signal received from the RF signal generator that is equal to the current value being tested (e.g., a phase shift of 15 degrees). Finally, the processing unit sends control signals (e.g., over connections 283, 284, FIG. 2) to the variable phase shifter of each of the remaining microwave power generation modules, which indicate that each of the remaining variable phase shifters should apply phase shifts to the excitation signals received from the RF signal generator that are equal to the default phase shifts that were set in block 306 (e.g., phase shifts of 0 degrees, or no phase shift). In response to the control signals, the RF signal generator produces the excitation signal at the acceptable frequency, $f_{ACC}$, the phase shifters phase shift the excitation signal by the specified phase shifts (when the phase shifts are non-zero), and each of the amplifiers (e.g., amplifier 255, FIG. 2) amplifies the excitation signals to provide a potentially phase shifted excitation signal to the microwave energy radiators (e.g., microwave energy radiators 230-232, FIG. 2).

The microwave energy radiators responsively radiate electromagnetic energy into the heating cavity (e.g., cavity 110, 210, FIGS. 1, 2). As the RF energy is being supplied to the load (e.g., load 212, FIG. 2), the system measures at least the reflected power (and possibly the forward power) using the power detection circuits. As described above, the system stores reflected power, forward power, and/or return loss measurements in the appropriate cell of the volatile reflected power indication table.

Iterations of loop 320 continue to be performed until all parameter values for the parameter most recently selected in block 312 (e.g., $p_1$) have been tested. For example, while keeping the excitation signal frequency set at $f_{ACC}$, and while keeping each of phase shifts $p_2$, $p_3$, $p_4$ set at the default values (e.g., 0 degrees), reflected power (and possible forward power) and/or return loss measurements are made for all values of $p_1$.

When all parameter values for the last-selected parameter (e.g., $p_1$) have been tested (e.g., all $p_1$ phase shifts have been tested and the reflected power indication table has been populated for the $p_1$ parameter), a determination again is made in block 322 whether or not all parameters have been swept. If not, the values stored in the reflected power indication table are evaluated to identify a phase shift value that yielded a lowest or an acceptable (e.g., below a threshold) value for the reflected power or the return loss, and that value is selected as the "acceptable" phase shift for $p_1$, referred to below as $p_{1ACC}$.

A next iteration of loop 310 is then performed, which includes setting the already-tested parameters to their "acceptable" values, selecting a next untested parameter, and sweeping through the values of that parameter. For example, when the next parameter to be swept is $p_2$, the parameter values may be set to $f=f_{ACC}$, $p_1=p_{1ACC}$, $p_2=15$ degrees, $p_3=0$ degrees (default value), and $p_4=0$ degrees (default value) for the first iteration of testing $p_2$. An acceptable value for $p_2$, or $p_{2ACC}$, is then determined as described above, and the next untested parameter (e.g., $p_3$) may then be tested. For the first iteration of testing $p_3$, the parameter values may be set to $f=f_{ACC}$, $p_1=p_{1ACC}$, $p_2=p_{2ACC}$, $p_3=15$ degrees, and $p_4=0$ degrees (default value). An acceptable value for $p_3$, or $p_{3ACC}$, is then determined as described above, and the next untested parameter (e.g., $p_4$) may then be tested. For the first iteration of testing $p_4$, the parameter values may be set to $f=f_{ACC}$, $p_1=p_{1ACC}$, $p_2=p_{2ACC}$, $p_3=p_{3ACC}$, and $p_4=15$ degrees. Assuming $p_4$ is the last parameter that was swept (as determined in block 322), an acceptable value for $p_4$, or $p_{4ACC}$, is then determined in block 326 as described above in conjunction with the description of block 324. At this point, an "acceptable combination" of excitation parameter values, $C_{ACC}$, has been identified as a combination that includes all of the "acceptable values," or $f=f_{ACC}$, $p_1=p_{ACC}$, $p_2=p_{2ACC}$, $p_3=p_{3ACC}$, and $p_4=p_{4ACC}$. In other words, $C_{ACC}=\{f_{ACC}, p_{1ACC}, p_{2ACC}, p_{3ACC}, p_{4ACC}\}$. In various embodiments, implementation of the above-described process results in identification of the acceptable combination as the combination of RF signal parameter values that corresponds to whichever one of the plurality of stored reflected power indications indicates a lowest reflected power and/or a lowest return loss. In other embodiments, implementation of the above-described process results in identification of the acceptable combination as a combination of RF signal parameter values that corresponds to one of the plurality of stored reflected power indications with a reflected power and/or a return loss that falls below a pre-determined threshold.

According to an embodiment, additional testing may be performed in block 330 to determine whether any combination in proximity to the acceptable combination (or a "proximate combination") may yield lower values for return loss or reflected power. When block 330 is performed, the acceptable combination identified in block 326 may be considered an "initial acceptable combination," and the combination identified by the process of block 330 may be considered a "final acceptable combination." "In proximity," in the context of block 330, means combinations for which parameter values for some or all of the excitation signal parameters are changed to be one or two higher and/or lower incremental values from the acceptable values determined according to the above-described method. In other words, in the reflected power indication table, block 314 is performed for a plurality of combinations of excitation signal parameters that are directly adjacent to $C_{ACC}$, or are one cell removed from $C_{ACC}$ in order to produce a plurality of additional reflected power indications. When a proximate combination yields a reflected power indication corresponding to a lower return loss or reflected power than the combination identified in block 326, the proximate combination may be considered to be "better" than the previously determined combination, and the acceptable combination may be changed to have parameter values corresponding to the better, proximate combination. In an alternate embodiment, block 330 may be excluded.

In block 332, the acceptable combination of parameters may then be stored in the aforementioned excitation table (e.g., Table 1, above) in the cell associated with the previously-determined load characteristics. For example, the combination of excitation signal parameters determined using the method may be stored in a cell within the excitation table that corresponds to the initial load characteristics (e.g., the cell marked with an "x" in the excitation table, above, that corresponds to a pound of chicken at 20 degrees F.).

In block 334, a determination may then be made whether or not loads with all desired load characteristics have been tested. For example, there may be a desire to test a particular load type at multiple temperatures (e.g., temperatures listed in the above excitation table, among others), and/or to test a variety of load types (e.g., load types listed in the above excitation table, among others), and/or to test a particular type of load with multiple weights. When all loads have not been tested, the method may be repeated. More specifically, the previously-tested load may be removed from the heating cavity, a load with different load characteristics may be placed in the heating cavity, in block 302, and the method may be repeated as discussed above. When all loads have been tested, then in block 336, the populated excitation table may be stored in system memory (e.g., memory 288, FIG. 2) for use during subsequent heating operations (e.g., as described in conjunction with FIG. 6, later).

Figure 4:
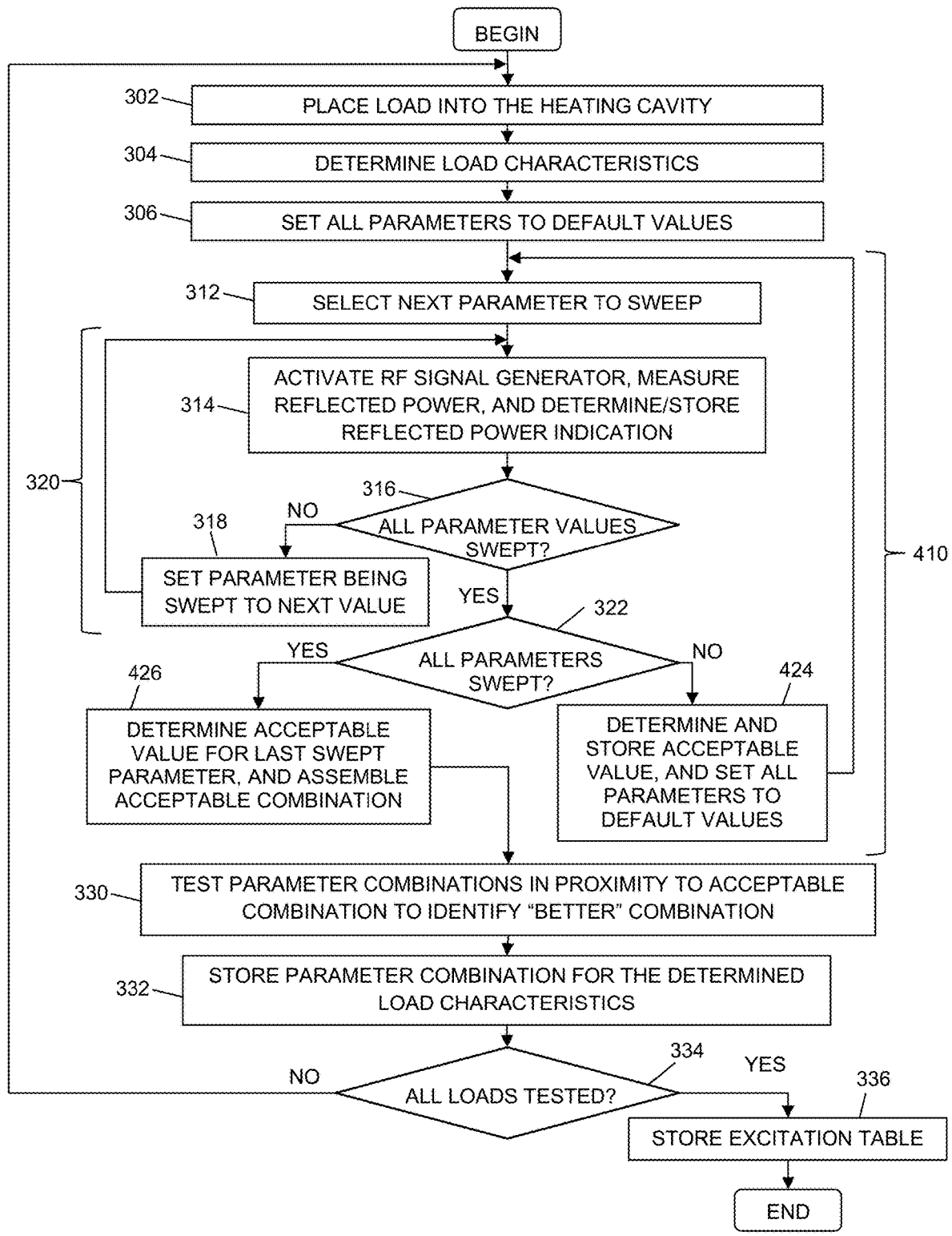
FIG. 4 is a flowchart of a method of operating a solid-state heating apparatus to determine acceptable excitation signal parameters, in accordance with another example embodiment.

FIG. 4 is a flowchart of a method of operating a solid-state heating system to determine acceptable excitation signal parameters, in accordance with another example embodiment. The method of FIG. 4 is substantially similar to the method of FIG. 3, and like processes are indicated with identical reference numbers in FIG. 3 and FIG. 4. All details and embodiments discussed above with respect to the method depicted in FIG. 3 apply equally to FIG. 4 unless otherwise indicated below.

The method of FIG. 4 differs from the method of FIG. 3 in the manner in which parameter values are reset at the end of outer loop 410. As described above in conjunction with FIG. 3, once an acceptable value for a just-swept parameter has been determined, the processing unit sets the just-swept parameter to the acceptable value, and the next iteration of loop 310 is performed with the just-swept parameter set to the determined acceptable value. In contrast, in accordance with the method of FIG. 4, in block 424 (which replaces block 324, FIG. 3), once an acceptable value for a just-swept parameter has been determined, the system stores the determined acceptable value as part of the acceptable combination of excitation parameter values, and the system then re-sets all parameter values to the default values originally set in block 306. At the next iteration of block 312, a next parameter is selected for testing, and the values of the next-selected parameter are swept while the other parameters remain set to the default values. Said another way, in the embodiment of FIG. 4, during the value sweeping operation performed for any given parameter, all other parameters are set to default values. At the conclusion of all iterations of outer loop 410, the acceptable values determined for each parameter are assembled into an identified acceptable combination of excitation parameter values in block 426.

Figure 5:
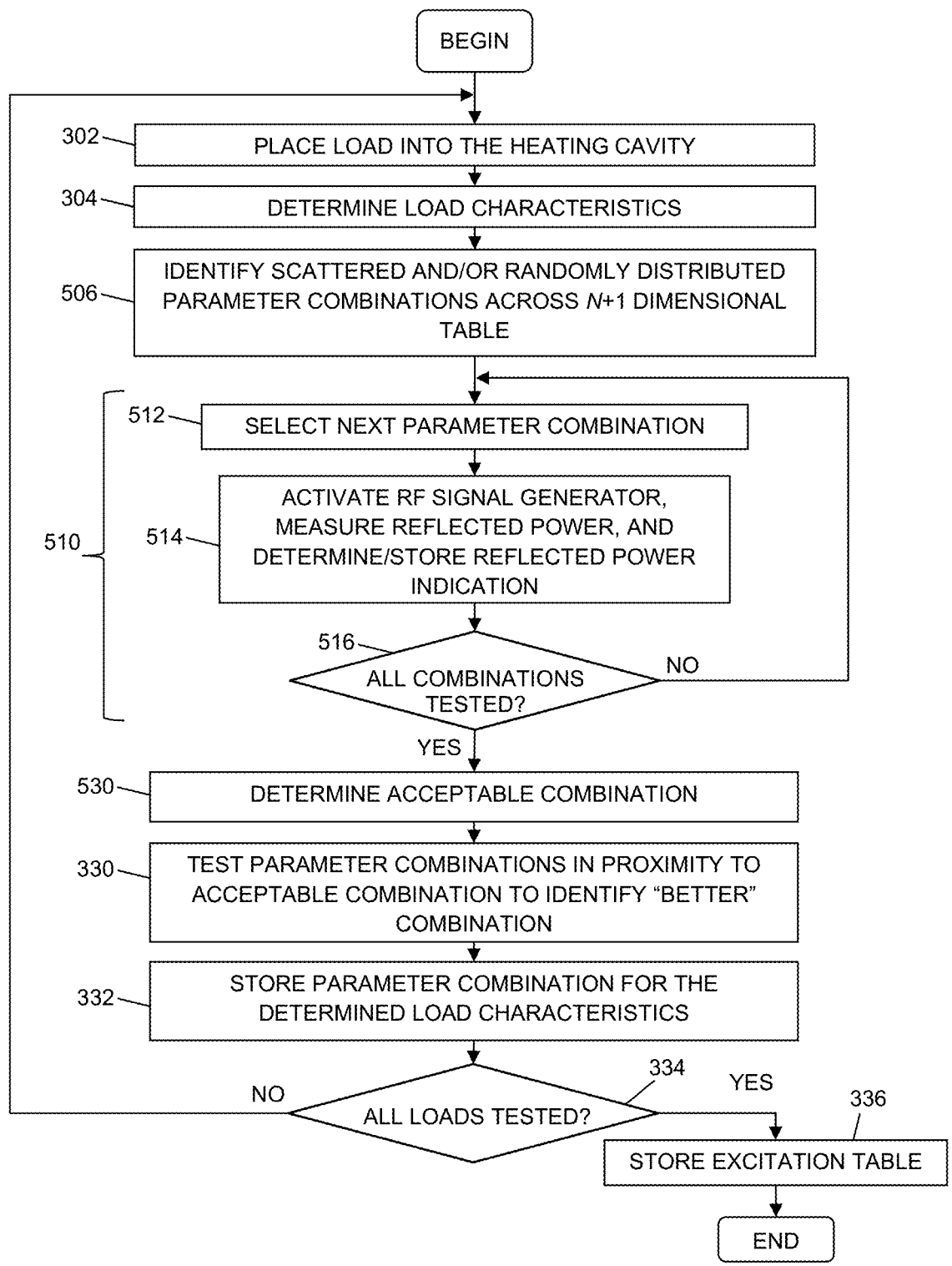
FIG. 5 is a flowchart of a method of operating a solid-state heating apparatus to determine acceptable excitation signal parameters, in accordance with yet another example embodiment.

FIG. 5 is a flowchart of a method of operating a solid-state heating system to determine acceptable excitation signal parameters, in accordance with yet another example embodiment. Similar to the methods depicted in FIGS. 3 and 4, the method of FIG. 5 utilizes the concept of a volatile, N+1 dimensional reflected power indication table, into which the processing unit stores reflected power indications associated with various combinations of excitation signal parameters. Again, the reflected power indication table may be an N+1 dimensional table, where each dimension corresponds to one of the N+1 excitation signal parameters. Each cell within the reflected power indication table may be used to store a reflected power indication (e.g., one or more values indicating the magnitude of reflected power or return loss) for a given combination of parameter values. In the methods of FIGS. 3 and 4, only those cells within the reflected power indication table that corresponded to tested combinations of parameters ultimately are populated with reflected power indications, and the "acceptable combination" of parameter values is selected as a combination for one of the populated cells. More specifically, all possible values for a first-tested parameter are tested (e.g., filling a first row of the reflected power indication table), then for a second-tested parameter, a vector of cells extending from the acceptable value of the first-tested parameter are tested, then for a third tested parameter, a vector of cells extending from the acceptable value of the second-tested parameter are tested, and so on through testing the last-tested parameter. Accordingly, as can be imagined, combinations of excitation signal parameters corresponding to a sequence of contiguous vectors of cells through the reflected power indication table are tested. This means that the system refrains from populating cells through many areas of the N+1 dimensional reflected power indication table. Theoretically, significantly better or best combinations of parameter values may fall within the unpopulated areas. In contrast with the methods of FIGS. 3 and 4, the method of FIG. 5 includes identifying and testing combinations of parameter values that are scattered and/or randomly distributed throughout the N+1 dimensional reflected power indication table. In this way, combinations of excitation signal parameters within more areas of the reflected power indication table may be evaluated.

The method of FIG. 5 begins, in blocks 302 and 304, by placing a load into the heating cavity, and determining load characteristics, as described above in conjunction with the method of FIG. 3. In block 506, a plurality of parameter combinations are then identified, where the parameter combinations are scattered and/or randomly distributed across the N+1 dimensional reflected power indication table. Once again, to assist in explanation, an example is used in which the excitation signal parameters include one excitation signal frequency, f, and four phase shift values, $p_1$, $p_2$, $p_3$, $p_4$. In other words, any particular parameter combination may be represented as $C_x=\{f_x, p_{1x}, p_{2x}, p_{3x}, p_{4x}\}$. As a further example, the excitation signal frequency may have any value selected from a set of values that includes (in GHz) 2.40, 2.41, 2.42, 2.43 . . . 2.48, 2.49, and 2.50 (i.e., any value between 2.40 and 2.50 GHz with a 10 MHz step size). Further, each of the phase shift values may be selected from a set of values that includes (in degrees) 0, 15, 30, 45 . . . , 330, 345, and 360 (i.e., any value between 0 and 360 degrees with a 15 degree step size). As discussed in detail previously, such an embodiment yields a reflected power indication table that includes approximately 4.3 million cells, with each cell corresponding to one combination of parameter values. This example is not meant to be limiting, as other implementations may have more, fewer, or different parameters, each parameter may cover a different range of possible values, and different step sizes may be defined between parameter values.

In one embodiment, the identified plurality of parameter combinations may include a percentage of all possible combinations (e.g., between 0.01% and 10%, or within some other range), and more specifically a set of combinations that are evenly scattered through the N+1 dimensional reflected power indication table at a desired density. For example, combinations could be identified that correspond to a 0.1% percentage of all possible combinations, wherein the identified combinations are evenly distributed through the reflected power indication table. In this example, approximately 4300 cells, or parameter combinations, that are scattered through the reflected power indication table would be identified for testing. In another embodiment, the identified plurality of parameter combinations may include a set of combinations that are determined using a random or pseudo-random cell (or combination) selection process. For example, a random or pseudo-random value generator may be used to determine a set of cells, or parameter combinations, that includes cells scattered throughout the reflected power indication table. In still other embodiments, more complicated cell or combination selection algorithms may be used. For example, a cell or combination selection algorithm may be configured to identify cells in one or more areas of the table at a higher density than the density of identified cells in other areas of the table. For example, such embodiments may increase the probability that cells associated with certain parameter value ranges will be selected for testing (e.g., parameter values closer to the center of the parameter value ranges).

Once the scattered and/or randomly distributed cells or parameter combinations have been identified, each parameter combination associated with the selected set of cells may be tested as an iteration of loop 510. More specifically, in block 512, a next combination of excitation signal parameters (associated with an identified cell) to be tested is selected from the set of parameter combinations identified in block 506. The parameter combination is then tested in block 514, which is substantially similar to block 314, discussed above in detail. As discussed above, testing a parameter combination includes the processing unit (e.g., processing unit 280, FIG. 2) activating the RF signal generator (e.g., RF signal generator 240, FIG. 2) by sending one or more control signals to the RF signal generator, which indicate that the RF signal generator should produce an excitation signal having a frequency equal to the excitation signal frequency specified in the combination selected in block 512. In addition, the processing unit sends control signals (e.g., over connections 282-284, FIG. 2) to the variable phase shifter (e.g., phase shifter 254, FIG. 2) of each of the microwave power generation modules, which indicate that each of the variable phase shifters should apply phase shifts to the excitation signals received from the RF signal generator that are equal to the phase shifts that are specified in the parameter combination selected in block 512. In response to the control signals, the RF signal generator produces the excitation signal at the specified frequency, the phase shifters phase shift the excitation signal by the specified phase shifts (when the phase shifts are non-zero), and each of the amplifiers (e.g., amplifier 255, FIG. 2) amplifies the excitation signals to provide a potentially phase shifted excitation signal to the microwave energy radiators (e.g., microwave energy radiators 230-232, FIG. 2). In other words, the processing unit causes each of the microwave power generation modules (e.g., modules 250-252, FIG. 2) to provide RF signals with frequencies and phases specified in the selected combination to each of the multiple microwave energy radiators. The microwave energy radiators responsively radiate electromagnetic energy into the heating cavity (e.g., cavity 110, 210, FIGS. 1, 2).

As the RF energy is being supplied to the load (e.g., load 212, FIG. 2), the system measures at least the reflected power using power detection circuits (e.g., circuits 260-262, FIG. 2) disposed along the transmission paths (e.g., paths 256-258, FIG. 2) between the microwave power generation modules and the microwave energy radiators. According to an embodiment, the power detection circuits also may measure the forward power along the transmission paths. In any event, each power detection circuit sends, to the processing unit, one or more signals indicating the magnitude of the measured reflected power (and possibly the magnitude of forward power, if measured). The processing unit then generates and stores a reflected power indication (e.g., the measurement(s) or a value derived from the measurements) in the cell of the reflected power indication table that corresponds to the selected parameter combination.

In block 516, a determination is made whether all combinations associated with cells identified in block 506 have been tested. If not, the procedure iterates as shown, and a next parameter combination associated with another identified, but as yet untested, cell is tested in a next iteration of loop 510. When all combinations identified in block 506 have been tested, an acceptable or best combination is determined, in block 530, from the results stored in the volatile reflected power indication table. According to various embodiments, the "acceptable combination" may be an excitation parameter combination that resulted in the lowest return loss or reflected power, a combination that resulted in a return loss that is below a pre-determined threshold, or a combination that resulted in a reflected power that is below a pre-determined threshold.

According to an embodiment, additional testing may be performed in block 330, as previously described, to determine whether any parameter combination in proximity to the acceptable combination (or a "proximate combination") may yield lower values for return loss or reflected power. When a proximate combination yields a lower return loss or reflected power, the proximate combination may be considered to be "better" than the previously determined combination, and the acceptable combination may be changed to have parameter values corresponding to the better, proximate combination. The remaining steps of the method may be substantially similar to those previously described, where like reference numbers correspond to like processes.

In FIGS. 3-5, various methods are used to determine acceptable excitation parameter combinations for loads with particular characteristics by testing a subset of a large number of possible excitation parameter combinations. Although certain methods were used to reduce the search and testing space, other methods alternatively could be used, including but not limited to identifying parameter combinations to be tested using a Monte Carlo tree search, a binary or half interval search, a comparison search, a modified linear search, and so on. Whichever embodiment is implemented, the methods of FIGS. 3-5 ultimately yield an excitation table (e.g., a populated version of Table 1, above), which indicates excitation signal parameters to be applied for loads with a variety of load characteristics. As described above, the populated excitation table is stored (e.g., in block 336, FIGS. 3-5) in system memory (e.g., memory 288, FIG. 2) for later use by the processing unit (e.g., processing unit 280) during a heating operation.

Figure 6:
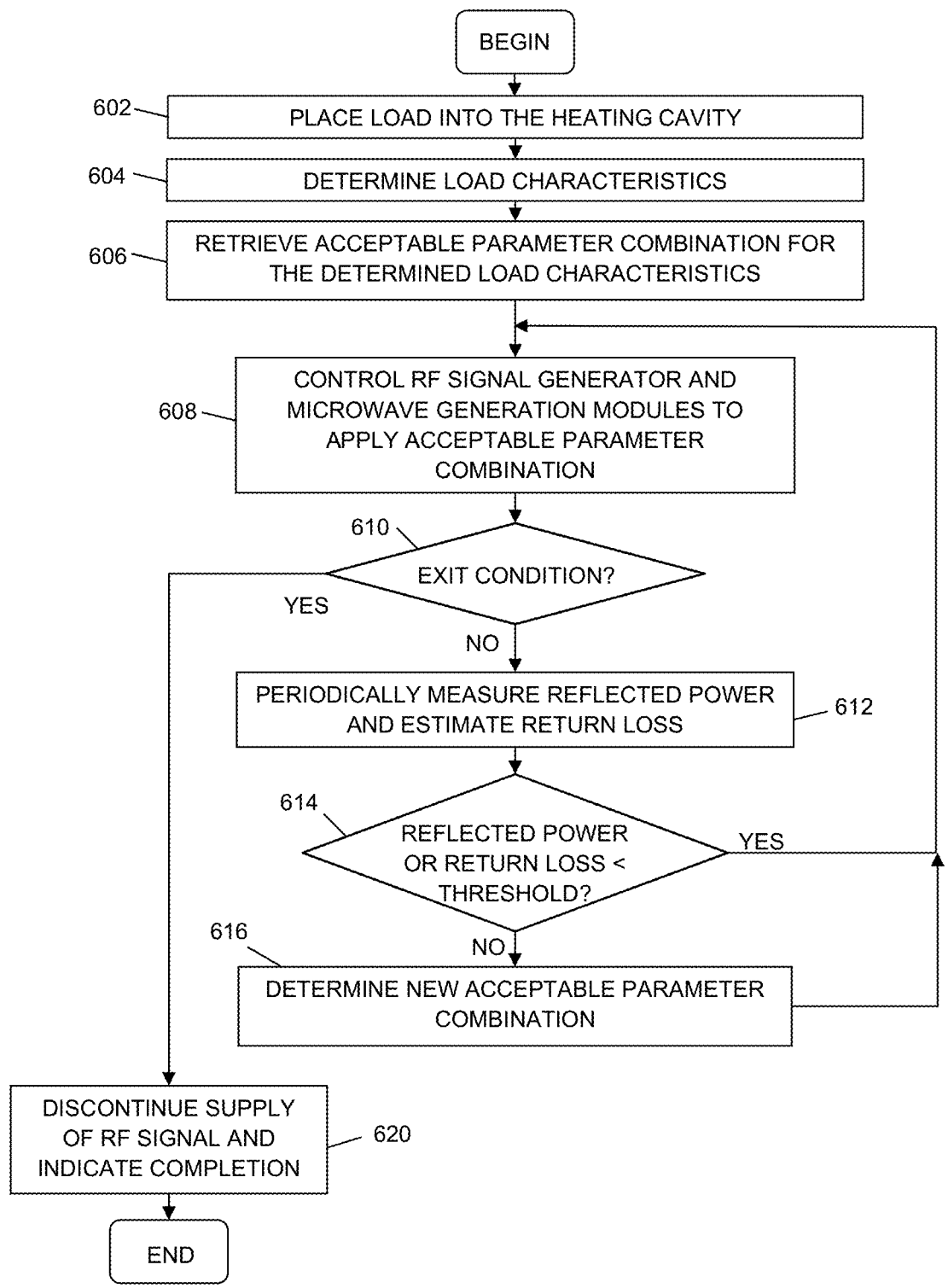
FIG. 6 is a flowchart of a method of performing a solid-state heating operation, in accordance with an embodiment.

FIG. 6 is a flowchart of a method of performing a solid-state heating operation using excitation signals with pre-determined excitation signal parameters, in accordance with an embodiment. The method may begin, in block 602, when a user places a load (e.g., load 212, FIG. 2) into a heating cavity (e.g., cavity 210, FIG. 2) of a solid-state heating system (e.g., system 200, FIG. 2), and seals the cavity (e.g., by closing a door or drawer). In an embodiment, sealing of the cavity may engage one or more safety interlock mechanisms, which when engaged, indicate that RF power supplied to the cavity will not substantially leak into the environment outside of the cavity. As will be described later, disengagement of a safety interlock mechanism may cause the processing unit immediately to pause or terminate the heating operation.

In block 604, the system determines one or more characteristics of the load. For example, as discussed previously, load characteristics may include the material(s) from which the load is formed, a state of the load, a weight of the load, and so on. In some embodiments, information indicating the load characteristics may be input by the user using the system's user interface (e.g., user interface 120, 220, FIGS. 1, 2). For example, the user may interact with the user interface to select from a list of load types weights (or quantities), and/or states embodied in the excitation table that was stored in system memory (e.g., in block 336, FIGS. 3-5). In alternate embodiments, the load characteristics may be obtained in some other way, such as by scanning a barcode on the load packaging and retrieving (e.g., from memory 288 or from a link to an external network) load information corresponding to the barcode, receiving an RFID signal from an RFID tag on or embedded within the load and retrieving (e.g., from memory 288 or from a link to an external network) load information corresponding to the RFID, receiving an indication of load weight (e.g., from a weight sensor 290, FIG. 2), and/or measuring an approximate temperature of the load (e.g., using temperature and/or IR sensors 290, FIG. 2).

The load characteristics indicate the cell (e.g., in an excitation signal table, such as Table 1, above) in which a previously-determined, acceptable excitation signal parameter combination was stored (e.g., during execution of embodiments of the methods of FIGS. 3-5). In block 606, the load characteristics determined in block 604 are used as keys to retrieve the acceptable parameter combination from the corresponding cell.

In block 608, after receiving a start indication from the user (e.g., by the user pressing a start button of user interface 220, FIG. 2), the processing unit provides control signals to the RF signal generator (e.g., RF signal generator 240, FIG. 2) and to the phase shifters of the microwave generation modules (e.g., phase shifter 254, FIG. 2) to cause those system components to apply the acceptable parameter combination to the excitation signals. More specifically, the processing unit initiates generation of the RF excitation signals by sending one or more control signals to the RF signal generator, which indicate that the RF signal generator should produce an excitation signal having a frequency equal to the excitation signal frequency indicated in the acceptable parameter combination. In addition, the processing unit sends control signals to the variable phase shifter of each of the microwave power generation modules, which indicate that each of the variable phase shifters should apply phase shifts to the excitation signals received from the RF signal generator that are equal to the phase shifts that are indicated in the acceptable parameter combination. In response to the control signals, the RF signal generator produces the excitation signal at the specified frequency, the phase shifters phase shift the excitation signal by the specified phase shifts (when the phase shifts are non-zero), and each of the amplifiers (e.g., amplifier 255, FIG. 2) amplifies the excitation signals to provide a potentially phase shifted excitation signal to the microwave energy radiators (e.g., microwave energy radiators 230-232, FIG. 2). In other words, the processing unit causes each of the microwave power generation modules (e.g., modules 250-252, FIG. 2) to provide RF signals with given frequencies and phases to each of the multiple microwave energy radiators. The microwave energy radiators responsively radiate electromagnetic energy into the heating cavity (e.g., cavity 110, 210, FIGS. 1, 2).

In block 610, the system may evaluate whether or not an exit condition has occurred. In actuality, determination of whether an exit condition has occurred may be an interrupt driven process that may occur at any point during the heating process. However, for the purposes of including it in the flowchart of FIG. 6, the process is shown to occur after block 608. In any event, several conditions may warrant cessation of the heating operation. For example, the system may determine that an exit condition has occurred when a safety interlock is breached. Alternatively, the system may determine that an exit condition has occurred upon expiration of a timer that was set by the user (e.g., through user interface 220, FIG. 2) or upon expiration of a timer that was established by the processing unit based on the processing unit's estimate of how long the heating operation should be performed. In still another alternate embodiment, the system may otherwise detect completion of the heating operation (e.g., when the load reaches a particular temperature or state).

When an exit condition has not occurred, then the heating operation may continue. During the heating operation, the electromagnetic energy supplied to the load increases the thermal energy of the load (i.e., the electromagnetic energy causes the load to warm up). Accordingly, the characteristics of the load (e.g., the impedance of the load) change as the thermal energy of the load increases. The impedance changes alter the absorption of RF energy into the load, and thus alter the magnitude of reflected power. To ensure that the magnitude of reflected power remains at acceptable levels throughout the heating operation, in block 612, one or more of the power detection circuits (e.g., power detection circuits 260-262, FIG. 2) periodically measures the reflected power along one or more of the transmission paths (e.g., paths 256-258, FIG. 2) between the microwave generation modules (e.g., modules 250-252, FIG. 2) and the microwave energy radiators (e.g., radiators 230-232, FIG. 2). In an embodiment, the power detection circuit(s) also may measure the forward power along the transmission path(s). The power detection circuit(s) provide those measurements to the processing unit (e.g., processing unit 280, FIG. 2), and based on the received measurements, the processing unit may then determine the reflected power and/or the return loss. When the processing unit receives multiple measurements from multiple power detection circuits, the processing unit may, for example, determine an average (or some other mathematical function) of contemporaneously received measurements to estimate the reflected power and/or return loss.

In block 614, the processing unit then may determine whether or not the measured or estimated reflected power and/or return loss is acceptable. For example, the processing unit may determine whether or not the reflected power and/or return loss falls below a threshold or compares favorably with some other criteria. When the processing unit determines that the reflected power and/or return loss is still acceptable (e.g., the value(s) are below a threshold), the excitation signal parameters applied by the processing unit may remain the same, and the process may iterate as shown in FIG. 6.

When the processing unit determines that the reflected power and/or return loss no longer is acceptable (e.g., the value(s) are above the threshold), the processing unit may determine a new set of acceptable excitation signal parameters, in block 616. For example, the processing unit may be configured to apply excitation signal parameters for proximate combinations within the excitation signal table, and to evaluate the resulting reflected power and/or return loss to determine a combination that results in an acceptable (e.g., below threshold) reflected power and/or return loss. Alternatively, the processing unit may be pre-programmed to apply a pre-determined sequence of parameter combinations that begins with the combination retrieved in block 606. Either way, once a new parameter combination has been determined, the method iterates as shown in FIG. 6. More specifically, in block 608, the processing unit causes the RF signal generator and the phase shifters of the microwave generation modules to apply the newly determined parameter combination to the RF excitation signal.

Referring again to block 610, when an exit condition has occurred, then in block 620, the processing unit causes the supply of the RF signal by the RF signal source to be discontinued. For example, the processing unit may disable the RF signal generator (e.g., RF signal generator 240, FIG. 2) and/or may cause the power supply and bias circuitry (e.g., circuitry 286, FIG. 2) to discontinue provision of the supply current. In addition, the processing unit may send signals to the user interface (e.g., user interface 120, 220, FIGS. 1, 2) that cause the user interface to produce a user-perceptible indicia of the exit condition (e.g., by displaying "door open" or "done" on a display device, or providing an audible tone). The method may then end.

It should be understood that the order of operations associated with the blocks depicted in FIGS. 3-6 corresponds to example embodiments, and should not be construed to limit the sequence of operations only to the illustrated orders. Instead, some operations may be performed in different orders, and/or some operations may be performed in parallel.

An embodiment of a method of establishing RF excitation signal parameters is performed in a solid-state heating apparatus that includes a cavity configured to contain a load. The method includes setting a plurality of the RF excitation signal parameters to a combination of parameter values, where the plurality of RF excitation signal parameters includes at least one excitation signal frequency and at least one phase shift, and providing, by the heating apparatus, a plurality of RF excitation signals to a plurality of microwave energy radiators that are proximate to the cavity, where the plurality of RF excitation signals have signal characteristics that are defined according to the combination of parameter values. While the plurality of RF excitation signals are being provided, the method further includes measuring, by at least one power detection circuit of the system, reflected RF power, determining, based on the measured reflected RF power, a reflected power indication, and storing the reflected power indication to produce a stored reflected power indication corresponding to the combination of parameter values. The method further includes repeating the setting, providing, measuring, determining, and storing processes multiple times for multiple different combinations of parameter values to produce a plurality of stored reflected power indications, where each of the plurality of stored reflected power indications corresponds to a different combination of RF signal parameter values. The method further includes identifying an acceptable combination of RF signal parameter values based on the plurality of stored reflected power indications, and storing, in a memory of the heating apparatus, the acceptable combination of RF signal parameter values.

An embodiment of a solid-state heating system includes a cavity configured to contain a load, a processing unit, at least one RF signal generator, a plurality of microwave generation modules, a plurality of microwave energy radiators, a plurality of transmission paths, and one or more power detection circuits. The processing unit is configured to produce one or more first control signals that indicate an excitation signal frequency, and to produce one or more second control signals that indicate one or more phase shifts, where the excitation signal frequency and the one or more phase shifts constitute a combination of parameter values. The at least one RF signal generator each is configured to receive one of the first control signals, and to produce a first RF excitation signal that is characterized by the excitation signal frequency. The plurality of microwave generation modules each is configured to receive one of the second control signals, to receive the first RF excitation signal, and to produce one of a plurality of second RF excitation signals, where each of the second RF excitation signals is characterized by a phase shift, if any, indicated in the received one of the second control signals, and the excitation signal frequency of the received first RF excitation signal. The plurality of microwave energy radiators each is coupled to an output of one of the microwave generation modules and configured to receive one of the second RF excitation signals and, in response, to radiate, into the cavity, electromagnetic energy corresponding to the received one of the second RF excitation signals. The plurality of transmission paths electrically couple the plurality of microwave generation modules to the plurality of microwave energy radiators. The one or more power detection circuits each is configured to take reflected RF power measurements along a transmission path of the plurality of transmission paths while the second RF excitation signals are being provided to the plurality of microwave energy radiators. The processing unit is further configured to determine, based on the reflected RF power measurements, a reflected power indication, store the reflected power indication to produce a stored reflected power indication corresponding to the combination of parameter values, repeat providing the first and second control signals multiple times for multiple different combinations of parameter values to produce a plurality of stored reflected power indications, where each of the plurality of stored reflected power indications corresponds to a different combination of the parameter values, identify an acceptable combination of parameter values based on the plurality of stored reflected power indications, and store, in a memory of the heating apparatus, the acceptable combination of parameter values.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A solid-state heating system that includes a cavity configured to contain a load that includes an object to be heated, the system comprising:
   a device configured to determine at least one characteristic of the load in the cavity;
   a radio frequency (RF) signal generator configured to produce a first RF excitation signal that is characterized by an excitation signal frequency;
   a plurality of microwave generation modules, each configured to receive the first RF excitation signal, and to produce one of a plurality of second RF excitation signals, wherein each of the second RF excitation signals is characterized by the excitation signal frequency of the received first RF excitation signal and a phase shift of one or more phase shifts, if any, indicated in a control signal of multiple control signals;

a plurality of microwave energy radiators, each coupled to an output of one of the plurality of microwave generation modules, and configured to receive one of the second RF excitation signals and, in response, to radiate, into the cavity, electromagnetic energy corresponding to the received one of the second RF excitation signals;

a plurality of transmission paths electrically coupling the plurality of microwave generation modules to the plurality of microwave energy radiators;

one or more power detection circuits, each configured to generate a measured reflected RF power value by measuring reflected RF power along a transmission path of the plurality of transmission paths while the second RF excitation signals are being provided to the plurality of microwave energy radiators, wherein the reflected RF power indicates a magnitude of RF power that is reflected from the cavity; and a processing unit configured to produce a plurality of stored reflected power indications by performing multiple iterations of a process that includes, for each iteration of the multiple iterations:
  setting a plurality of RF excitation signal parameters to a unique combination of parameter values that is different from combinations of parameter values used in other iterations of the multiple iterations, wherein the plurality of RF excitation signal parameters includes the excitation signal frequency and the one or more phase shifts,
  providing the multiple control signals to the plurality of microwave generation modules,
  determining, based on the measured reflected RF power value received from each of the one or more power detection circuits, a reflected power indication, and
  storing the reflected power indication to produce a stored reflected power indication corresponding to the unique combination of parameter values, and
wherein the processing unit is further configured to:
  identify a particular one of the plurality of stored reflected power indications that indicates a lowest reflected power or return loss in comparison with the reflected power or return loss indicated by other ones of the plurality of stored reflected power indications, or that indicates a reflected power or return loss that falls below a pre-determined threshold,
  designate the unique combination of parameter values corresponding to the particular one of the plurality of stored reflected power indications as an acceptable combination of RF signal parameter values, and
  store, in a memory of the heating apparatus, the acceptable combination of RF signal parameter values in a table that correlates the acceptable combination of the RF signal parameter values with the at least one characteristic of the load.

2. The system of claim 1, wherein:
the system includes N microwave generation modules each configured to receive one of N first RF excitation signals and to produce one of N second RF excitation signals, and N microwave energy radiators each coupled to an output of one of the N microwave generation modules.

3. The system of claim 1, wherein:
the system includes N microwave generation modules each configured to produce one of N second RF excitation signals, N microwave energy radiators each coupled to an output of one of the N microwave generation modules through one of N transmission lines, and multiple power detection circuits, wherein N is an integer greater than one;
and
wherein the processing unit is configured to determine the reflected power indication by applying a mathematical function to the measured reflected power value received from each of the multiple power detection circuits,
  determining based on the measured reflected RF power value received from each of the one or more power detection circuits a reflected power indication.

4. The system of claim 1, wherein:
the one or more power detection circuits also are configured to take a plurality of forward power measurements along the transmission paths; and
the processing unit is configured to determine the reflected power indication based on the reflected RF power measurements and the forward power measurements.

5. The system of claim 1, wherein the processing unit is further configured to:
repeat the producing, identifying, designating, and storing processes for a plurality of loads with a plurality of different characteristics.

6. The system of claim 1, wherein:
the processing unit is configured to determine the reflected power indication by determining a value selected from a reflected power measurement, an average of multiple reflected power measurements, a return loss measurement, and an average of multiple return loss measurements.

7. The system of claim 1, wherein:
each of the one or more power detection circuits are further configured to take forward power measurements along the transmission paths of the plurality of transmission paths while the second RF excitation signals are being provided to the plurality of microwave energy radiators, and
the processing unit is configured to determine the reflected power indication based on the reflected RF power measurements and the forward power measurements.

* * * * *